United States Patent [19]
Spease et al.

[11] Patent Number: 5,199,320
[45] Date of Patent: Apr. 6, 1993

[54] REMOTE CONTROL ASSEMBLY WITH CONDUIT ANCHOR DEVICE

[75] Inventors: Arthur L. Spease, Bloomfield Hills; Elio Evangelista, Washington, both of Mich.

[73] Assignee: Teleflex Incorporated, Limerick, Pa.

[21] Appl. No.: 838,563

[22] Filed: Feb. 19, 1992

[51] Int. Cl.⁵ .............................................. F16C 1/10
[52] U.S. Cl. .................................. 74/502.4; 74/502.6
[58] Field of Search ................. 74/502.3, 502.4, 502.5, 74/502.6

[56] References Cited

U.S. PATENT DOCUMENTS

| | | | |
|---|---|---|---|
| 3,192,795 | 7/1965 | Pierce | 74/502.5 |
| 3,263,520 | 8/1966 | Tschanz | 74/502.4 |
| 3,354,742 | 11/1967 | Tschanz et al. | 74/502.4 |
| 3,395,551 | 8/1968 | Morse | 74/502.5 X |
| 4,038,881 | 8/1977 | Conrad | 74/502.4 |
| 4,339,213 | 7/1982 | Gilmore | 74/502.4 X |
| 4,811,621 | 3/1989 | Spease | 74/502.4 X |
| 5,018,251 | 5/1991 | Brown | 74/502.6 X |

FOREIGN PATENT DOCUMENTS

| | | | |
|---|---|---|---|
| 209249 | 1/1987 | European Pat. Off. | 74/502.4 |
| 2842960 | 6/1979 | Fed. Rep. of Germany | 74/502.4 |
| 2821374 | 8/1979 | Fed. Rep. of Germany | 74/502.4 |
| 1128159 | 9/1968 | United Kingdom | 74/502.4 |

Primary Examiner—Rodney H. Bonck
Assistant Examiner—Ryan W. Massey
Attorney, Agent, or Firm—Reising, Ethington, Barnard, Perry & Milton

[57] ABSTRACT

A motion transmitting remote control assembly (10) of the type for transmitting motion in a curved path by a flexible motion transmitting core element (20). A conduit (12) comprises an outer jacket (14), an inner sheath (16), and support wires (18) disposed therebetween. A flexible motion transmitting core element (20) is slidably disposed within the inner sheath (16). A conduit anchor device securely clamps opposing surfaces on the support wires (18) between an inner ferrule (26) and an outer ferrule (24) to anchor the conduit (12) against loads placed thereon.

10 Claims, 2 Drawing Sheets

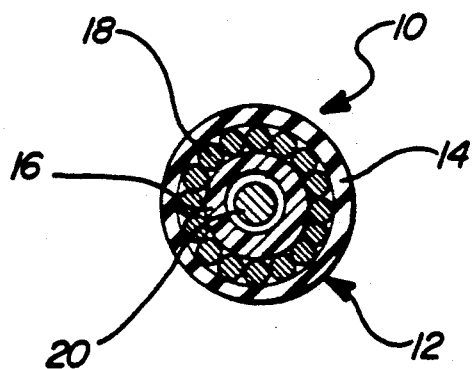
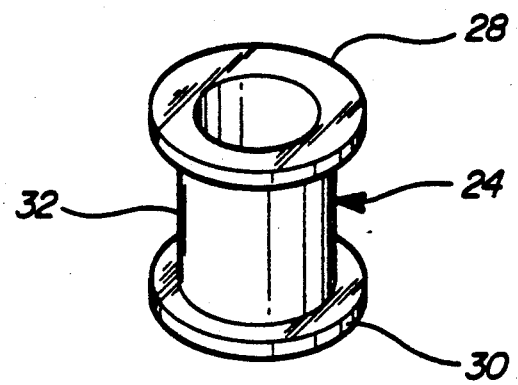
FIG-1    FIG-2
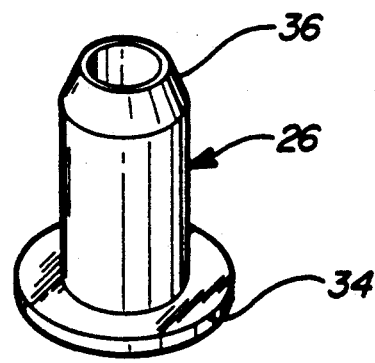
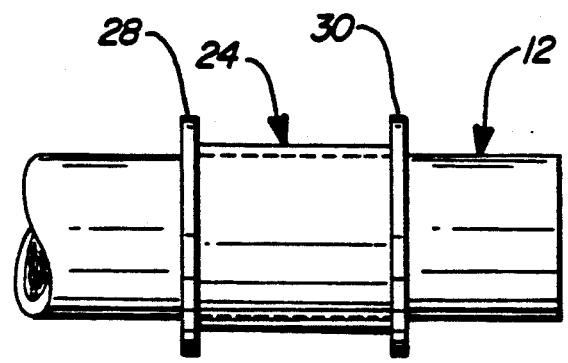
FIG-3    FIG-4
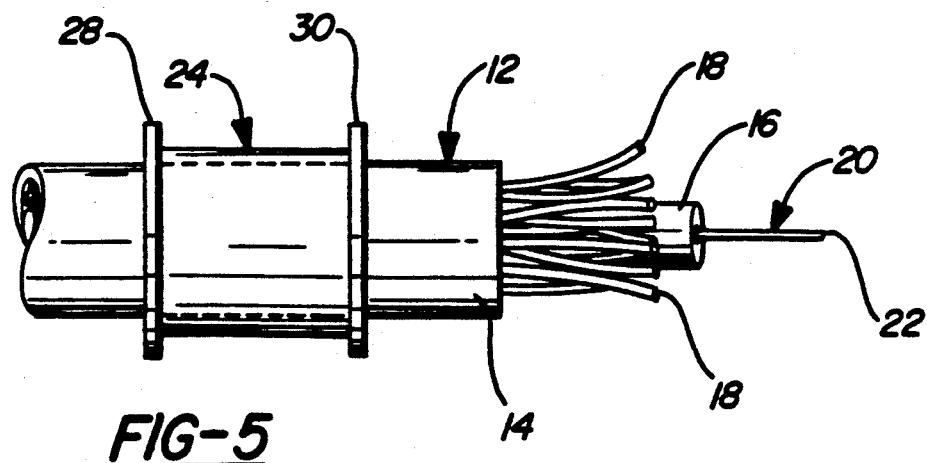
FIG-5

REMOTE CONTROL ASSEMBLY WITH CONDUIT ANCHOR DEVICE

TECHNICAL FIELD

The subject invention relates to a motion transmitting remote control assembly of the type for transmitting motion in a curved path by a flexible motion transmitting core element. More specifically, the subject invention relates to a conduit anchor device for securing against loads placed thereon.

BACKGROUND ART

Remote control assemblies are used to transfer an actuating force from an initial location to a device at another location. These assemblies generally include a conduit comprising an outer jacket, an inner sheath, and support wires disposed between the outer jacket and inner sheath to provide strength and structural stiffness for the conduit. A core element is slidably disposed within the conduit and connects the actuator and its corresponding device in remote control engagement. The conduit must be securely fastened to a housing or other structure, however, in order to provide a stable path for the core element to travel within. This is especially important when compressive or tensile loads on the core element place both lateral and axial forces on the conduit.

Conduit anchor devices have been created to provide a stable location for attachment of the conduit to a support bracket or other structure. These devices traditionally use a variety of methods to securely attach the anchor device to the conduit. Many such devices must be crimped onto the conduit, and even then can withstand only minimal loads. Crimping may not be desirable, however, if potential damage to the conduit may result.

To avoid crimping, other anchor devices require insertion of additional wires or other material beneath the anchor device to provide a tight fit of the device over the conduit. Unfortunately, this is a time consuming, labor intensive activity. For example, Great Britain Patent Number 1,128,159 discloses a remote control assembly including a conduit anchor device of this type. The conduit includes an inner sheath, an outer jacket, and support wires disposed therebetween. The conduit anchor device comprises a hollow cylindrical member with an inner diameter larger than the outer diameter of the conduit. In this manner the anchor device can slide freely over the conduit. The anchor device is mounted onto the conduit by first stripping away a section of the outer jacket and exposing the support wires underneath. The anchor device is then slipped over the wires, and two additional wires are inserted under the anchor device to tighten the fit around the conduit. Finally, the anchor device is hammered onto the conduit to further secure the fit. Accordingly, this operation is highly labor intensive in that hammering is required and additional wires must be inserted under the anchor device before the anchor device is operational.

Furthermore, conduit anchor devices which do not require crimping or inserting additional material under the device have other shortcomings. For example, U.S. Pat. No. 2,263,519 to Conrad, assigned to the assignee of the present invention, discloses a conduit with an anchor device of this type. The conduit includes an inner sheath, an outer jacket, and support wires disposed therebetween. The anchor device is a molded end fitting that is formed directly onto the conduit. The end of the conduit is initially flared outwardly with a press prior to molding the anchor device on the conduit. The end of the conduit is then placed in a plastic injection die cavity and the anchor device is formed around the end of the conduit. While this results in a securely attached anchor device, the process is highly labor intensive and necessarily requires large, expensive machinery.

SUMMARY OF THE INVENTION AND ADVANTAGES

The present invention provides a motion transmitting remote control assembly of the type for transmitting motion in a curved path by a flexible motion transmitting core element. The assembly comprises a conduit comprising an outer jacket, an inner sheath, and support wires disposed between the outer jacket and the inner sheath. A flexible motion transmitting core element is disposed within the inner sheath. An outer ferrule is disposed over the support wires. The invention is characterized by an inner ferrule disposed over the inner sheath and under the support wires and axially moveable into overlapping engagement with the outer ferrule to mechanically and securely clamp opposing surfaces on the support wires with respective inner and outer ferrules to remain fixedly attached to the conduit when loads are placed thereon.

Furthermore, a method is disclosed for mounting a conduit anchor device onto a motion transmitting remote control assembly of the type for transmitting motion in a curved path by a flexible motion transmitting core element. The method includes placing an outer ferrule over a plurality of support wires on a conduit. An inner ferrule is placed over an inner sheath and under the support wires on the conduit. Furthermore, the outer ferrule is moved toward the inner ferrule in overlapping engagement to mechanically and securely clamp opposing surfaces on the support wires between the outer ferrule and the inner ferrule to provide an anchor on the conduit against loads placed thereon.

One advantage of the present invention is that crimping is not required for a secure fit on the conduit, thereby avoiding the possibility of damaging the core element or reducing the inner diameter of the conduit inner sheath or liner with excessive crimping forces. Rather, by simply sliding the outer ferrule over the support wires and over the inner ferrule, the support wires are securely clamped therebetween, i.e. no matter how tightly the support wires are clamped between the inner and outer ferrules, the core element can never be damaged and the diameter of the inner sheath or liner cannot be reduced. Furthermore, the present invention does not require any additional wires or other material to be inserted between the ferrules and the support wires to provide a tight clamping fit. The present invention provides a relatively simple operation of slipping two ferrules onto a conduit to provide a conduit anchor device, as opposed to the more complex operations for doing the same as shown in the prior art.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional end view of the conduit of the present invention;

FIG. 2 is a perspective view of the outer ferrule;

FIG. 3 is a perspective view of the inner ferrule;

FIG. 4 is a side view of the outer ferrule disposed over the conduit;

FIG. 5 is a side view of the conduit and outer ferrule of FIG. 4 with a portion of the outer jacket stripped away from the free end of the conduit;

DETAILED DESCRIPTION OF THE PREFERRED EMBODIMENT

Figure 6:
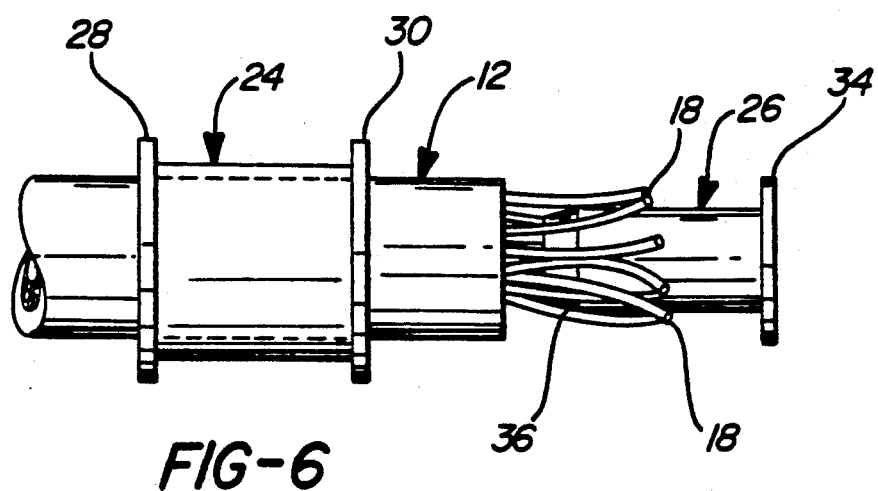
FIG. 6 is a perspective view of the conduit and outer ferrule of FIG. 5 with the inner ferrule disposed over the inner sheath and under the support wires.

A motion transmitting remote control assembly of the type for transmitting motion in a curved path by a flexible motion transmitting core element is generally shown at 10 in FIG. 1. The assembly 10 includes a conduit 12 comprising an outer jacket 14, an inner sheath 16, and support wires 18 disposed therebetween. A flexible motion transmitting core element 20 is slidably disposed within the inner sheath 16 and includes ends 22 extending outwardly therefrom.

The conduit 12 is a flexible cylindrical member that provides a stable guide path for the core element 20 to travel within. The inner sheath 16 is made of a flexible plastic or other material and is disposed through the center of the conduit 12. Any other material could be used, however, that would provide a relatively low friction path for the core element 20.

The support wires 18 are generally made of cylindrical metal strands and extend longitudinally along and helically surround the inner sheath 16. Each of the support wires 18 include a predetermined diameter substantially equal to one another. The support wires 18 provide protection for the inner sheath 16 against sharp objects that could inadvertently sever the inner sheath 16 and the core element 20 within. In addition, the support wires 18 provide structural stiffness and support against radial loads for the conduit 12 as a whole.

The outer jacket 14 is made of a flexible material such as rubber and surrounds the inner sheath 16 and the support wires 18. In this manner, the outer jacket 14 forms an exterior cover for the conduit 12 for protection against foreign substances that could corrode or damage the conduit 12 or core element 20.

The core element 20 is generally a thin metal wire that slidably extends throughout the length of the inner sheath 16. Alternatively, the core element 20 could comprise a thin metal cable formed of multiple wires for added strength. The core element 20 includes ends 22 that extend from the inner sheath 16 for attachment to an actuator and corresponding device to be actuated (not shown). The remote control assembly 10 thus transfers motion from the actuator via the core element 20 to the corresponding device. A movement by the actuator will cause a resulting movement by the core element 20. This in turn will produce an identical movement in the corresponding device. The flexibility of the core element 20 and conduit 12 allow the remote control motion to be transferred in directions other than in a straight path. Thus, motion can be transferred across areas of limited and convoluted free space. This type of remote control assembly in which actuating forces are transferred via the sliding action of a flexible core element within a conduit is well known throughout the art. For example, U.S. Pat. No. 4,811,621 to Spease and assigned to the assignee of the present invention discloses a push-pull remote control assembly of this type.

An outer ferrule 24 is disposed over the conduit 12 and over the support wires 18. An inner ferrule 26 is disposed over the inner sheath 16 and under the support wires 18 to mechanically and securely clamp the support wires 18 between the outer ferrule 24 and the inner ferrule 26. The outer ferrule 24 and inner ferrule 26 collectively form a conduit anchor device for the conduit 12.

In FIGS. 2 and 3, the inner ferrule 26 and the outer ferrule 24 are shown comprising two components of the conduit anchor device. The outer ferrule 24 is a hollow cylindrical member with a top flange 28 and a bottom flange 30. In other words, the outer ferrule 24 is a spool-shaped member. The area between the top flange 28 and bottom flange 30 forms a retaining groove 32. The retaining groove 32 provides a convenient location for attachment of the conduit 12 to a housing or other support structure. The spool-shape of the outer ferrule 24 is thus not essential to the invention, but rather is included merely for convenience during attachment of the conduit 12. Generally, the outer ferrule 24 is made of a high strength metal such as steel to provide the greatest structural strength. However, any type of metal could be used and would provide adequate results.

The inner ferrule 26 is also a hollow cylindrical member with a flanged base 34 at one end and a ramping surface 36 at another end. The flanged base 34 is approximately the same diameter as the bottom flange 30 on the outer ferrule 24. The ramping surface 36 comprises a small area at one end of the inner ferrule 26 where the diameter thereof gradually decreases. The inner ferrule 26 also includes an inner diameter which is substantially equal to the outer diameter of the inner sheath 16. In this manner, the inner ferrule 26 slides freely onto the inner sheath 16. The inner ferrule 26 is generally made of a high strength metal such as steel to achieve the greatest structural strength, although any metal would suffice. For added toughness, the inner ferrule 26 can be heat treated as would be especially useful if crimping of the outer ferrule 24 against the inner ferrule 26 were desired.

The inner ferrule 26 includes an outer diametral measure which is less than the inner diametral measure of the outer ferrule 24. Thus, the clearance established between the inner ferrule 26 and outer ferrule 24 comprises an annular interstitial space having a radial interstitial distance equal to the arithmetic difference between the inner diameter of the outer ferrule 24 and the outer diameter of the inner ferrule 26. Specifically, the radial interstitial distance is less than the diameter of the support wires 18. In other words, the diametral interstitial distance is equal to two times the diameter of a support wire 18 to provide for support wires 18 surrounding all sides of the inner ferrule 26. Accordingly, the support wires 18 are securely clamped between the inner ferrule 26 and the outer ferrule 24.

Figure 7:
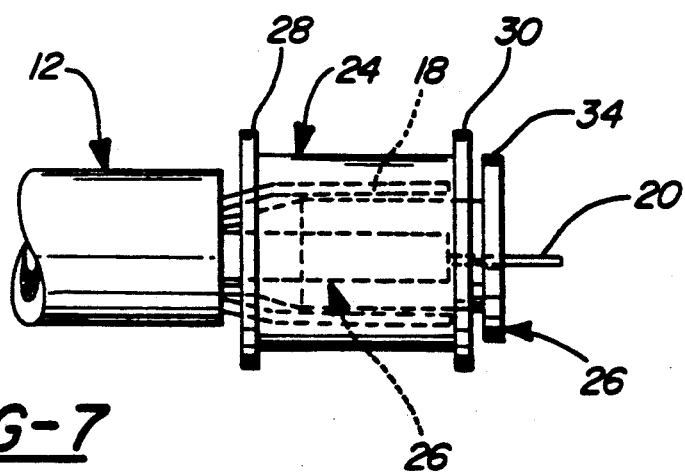
FIG. 7 is a cross sectional side view showing the outer ferrule disposed over the support wires and surrounding the inner ferrule in a concentrically overlapping operative position.
Figure 8:
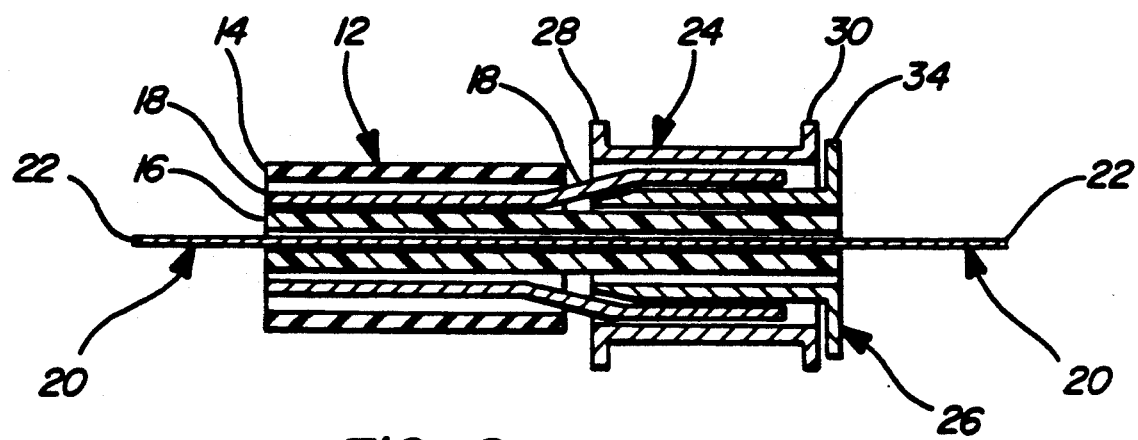
FIG. 8 is a full side view of the assembly of FIG. 7.

To install the conduit anchor device onto the remote control assembly 10, the outer ferrule 24 is first slipped over a free end of a section of the conduit 12 as shown in FIG. 4. Next, as shown in FIG. 5 a portion of the outer jacket 14 is stripped away from the free end of the conduit 12 exposing the support wires 18 and inner sheath 16 underneath. The support wires 18 may tend to flare out after the jacket is stripped, but further spreading of the wires may be necessary to fully separate the support wires 18 from the inner sheath 16. The inner ferrule 26 is then placed over the inner sheath 16 and under the support wires 18 and axially slid onto the inner sheath 16 until the flanged base 34 is approximately flush with the end of the inner sheath 16. The ramping surface 36 on the inner ferrule 26 further aids the spreading of the support wires 18 from the inner sheath 16 as the ramping surface 36 is moved thereunder. Finally, the outer ferrule 24 is moved toward the inner ferrule 26. As the outer ferrule 24 begins to cover the inner ferrule 26, the ramping surface 36 on the inner ferrule 26 acts like a shoe horn allowing the outer ferrule 24 to gradually slide over the support wires 18 thereby compressing the support wires 18 over the inner ferrule 26. Without the ramping surface 36, it is possible that the insertion of the outer ferrule 24 over the inner ferrule 26 could create shear forces on the support wires 18 that could potentially weaken or sever the support wires 18. In this manner, the support wires 18 are firmly clamped on opposing surfaces between the inner 26 and outer 24 ferrules until the outer ferrule 24 substantially surrounds and is concentric with the inner ferrule 26. FIGS. 7 and 8 illustrate the conduit anchor device disposed for operation on the conduit 12. At this point, the flanged base 34 of the inner ferrule 26 is disposed adjacent the bottom flange 30 on the outer ferrule 24.

Since the radial interstitial distance between the inner ferrule 26 and the outer ferrule 24 is less than or equal to the diameter of the support wires 18, the support wires 18 are "force fit" therebetween. As the outer ferrule 24 is placed over the inner ferrule 26 and the support wires 18, the support wires 18 are radially compressed. The support wires 18 thus tightly deform to occupy the space that previously existed interstitially between the support wires 18 when the support wires 18 were completely circular. This creates a large radial reaction force on the outer ferrule 24 and inner ferrule 26 that imposes a large clamping force therebetween, yet fully isolates the core element 20 from any forces whatsoever. Tension on the conduit 12 causes a radial reaction force and moment between the support wires 18 and the ferrules 24,26 creating a tighter fit. Compressive loading on the conduit 12 will cause the support wires 18 to exert a pulling force on the ferrules 24,26. However, the abutment of flange 34 against flange 30 prevents relative movement between the ferrules 24,26, and the radial forces or moment of the wires 18 on the ferrules 24,26 prevents the wires 18 from withdrawing from the ferrules 24,26.

Once installed, the anchor device can withstand approximately 100 Kg of tensile force without being crimped onto the conduit 12. This is achieved due to the tight fit of the support wires 18 between the inner ferrule 26 and the outer ferrule 24. For high loads, however, the anchor device can be crimped onto the conduit 12. In this manner, the conduit anchor device would even more securely clamp the support wires 18 to prevent slippage off of the conduit 12 while loads are placed thereon. Only a light crimp is required to take up tolerance variations due to the already secure fit of the conduit anchor device 10 on the conduit 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting motion in a curved path by a flexible motion transmitting core element (20), said assembly comprising:
   a conduit (12) comprising an outer jacket (14), an inner sheath (16), and support wires (18) of a predetermined diameter disposed between said outer jacket (14) and said inner sheath (16);
   a flexible motion transmitting core element (20) disposed within said inner sheath (16);
   a cylindrical outer ferrule (24) disposed over said support wires (18); and
   characterized by a cylindrical inner ferrule (26) disposed over said inner sheath (16) and under said support wires (18) and axially moveable into overlapping engagement with said outer ferrule (24) to form a radial interstitial space therebetween smaller than the diameter of the support wires, whereby the support wires are radially compressed and deformed to tightly occupy said interstitial space as the inner and outer ferrules (26,24) are moved into overlapping engagement thereby securely clamping said support wires (18) between said inner and outer ferrules (26,24).

2. An assembly as set forth in claim 1 further characterized by said inner ferrule (26) therefor slidably disposed on said inner sheath (16) and contiguously beneath said support wires (18).

3. An assembly as set forth in claim 2 further characterized by said outer ferrule (24) contiguously surrounding said support wires (18) and concentrically surrounding said inner ferrule (26).

4. An assembly as set forth in claim 3 further characterized by said inner ferrule (26) including a flanged base (34).

5. An assembly as set forth in claim 4 further characterized by said inner ferrule (26) including a ramping surface (36) distal said flanged base (34).

6. An assembly as set forth in claim 3 further characterized by said outer ferrule (24) including a top flange (28).

7. An assembly as set forth in claim 6 further characterized by said outer ferrule (24) including a bottom flange (30) moveable into abutting engagement with said flanged base (34) of said inner ferrule (26).

8. A method for mounting a conduit anchor device onto a motion transmitting remote control assembly (10) of the type for transmitting motion in a curved path by a flexible motion transmitting core element (20), said method comprising the steps of:
   placing an outer ferrule (24) over a plurality of support wires (18) on a conduit (12);
   placing an inner ferrule (26) over an inner sheath (16) and under the support wires (18) on the conduit (12);
   moving the outer ferrule (24) toward the inner ferrule (26) in overlapping engagement to form an interstitial space therebetween smaller than the diameter of the support wires (18); and characterized by radially compressing and deforming the support wires (18) to tightly fit within the interstitial space between the inner and outer ferrules (26,24), thereby providing a secure anchor on the conduit (12) against loads placed thereon.

9. A method as set forth in claim 8 further characterized by crimping outer ferrule (24) onto the conduit (12).

10. A method as set forth in claim 9 further characterized by removing a portion of the outer jacket (14) on the conduit (12) to expose the support wires (18) and the inner sheath (16) prior to said placing the inner ferrule (26) over the inner sheath (16).

* * * * *